(12) United States Patent
Santiago et al.

(10) Patent No.: US 8,138,418 B2
(45) Date of Patent: Mar. 20, 2012

(54) ELECTRICAL JUNCTION BOX

(75) Inventors: Dwight D. Santiago, Summerfield, NC (US); Dan Dix, Irvine, CA (US); Huan Nguyen, Gardena, CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 221 days.

(21) Appl. No.: 12/703,541

(22) Filed: Feb. 10, 2010

(65) Prior Publication Data

US 2011/0192644 A1   Aug. 11, 2011

(51) Int. Cl.
*H05K 5/00* (2006.01)

(52) U.S. Cl. .......... 174/58; 174/520; 439/535; 248/906; 361/826

(58) Field of Classification Search .............. 174/58, 174/520; 439/535; 248/343, 906; 361/826
See application file for complete search history.

(56) References Cited

U.S. PATENT DOCUMENTS

| | | | |
|---|---|---|---|
| 3,033,913 A | 5/1962 | Dietze | |
| 3,148,899 A | 9/1964 | Grinstead | |
| 3,369,071 A | 2/1968 | Tuisku | |
| 4,880,387 A | 11/1989 | Stikeleather et al. | |
| 4,924,032 A | 5/1990 | Akins | |
| 5,132,493 A | 7/1992 | Sheehan | |
| 5,662,414 A | 9/1997 | Jennings et al. | |
| 5,758,959 A | 6/1998 | Sieczkowski | |
| 5,957,573 A | 9/1999 | Wedekind et al. | |
| 6,123,438 A | 9/2000 | Hentz | |
| 6,147,307 A | 11/2000 | Ling et al. | |
| 6,300,567 B1 | 10/2001 | Hayduke et al. | |
| 6,380,483 B1 | 4/2002 | Blake | |
| 6,498,295 B1 | 12/2002 | Akiyama et al. | |
| 6,996,943 B2 | 2/2006 | Denier et al. | |
| 7,191,993 B2 | 3/2007 | Bobrowski | |
| 7,297,870 B1 * | 11/2007 | Sartini .................. 174/50 |
| 7,869,681 B2 * | 1/2011 | Battey et al. ......... 385/135 |
| 7,952,022 B2 * | 5/2011 | Rippel et al. .......... 174/50 |
| 8,014,170 B2 * | 9/2011 | Mori et al. ........... 361/826 |
| 2009/0223696 A1 | 9/2009 | Gawoski | |
| 2009/0231862 A1 | 9/2009 | Seo | |

* cited by examiner

*Primary Examiner* — Dhirubhai R Patel
(74) *Attorney, Agent, or Firm* — Paul Y. Feng; The Eclipse Group LLP

(57) ABSTRACT

A junction box having a sheathed cable retainer structure is disclosed. The junction box contains pry outs that cover openings at corners of the junction box wherein the pry outs are removed and a sheathed cable or like electrical wiring can pass therethrough. A strain relief bracket having segmented distal bends at opposite ends thereof engages the cable and under bias pushes the cable against an indent formed on a wall inside the junction box opposite the cable.

21 Claims, 14 Drawing Sheets

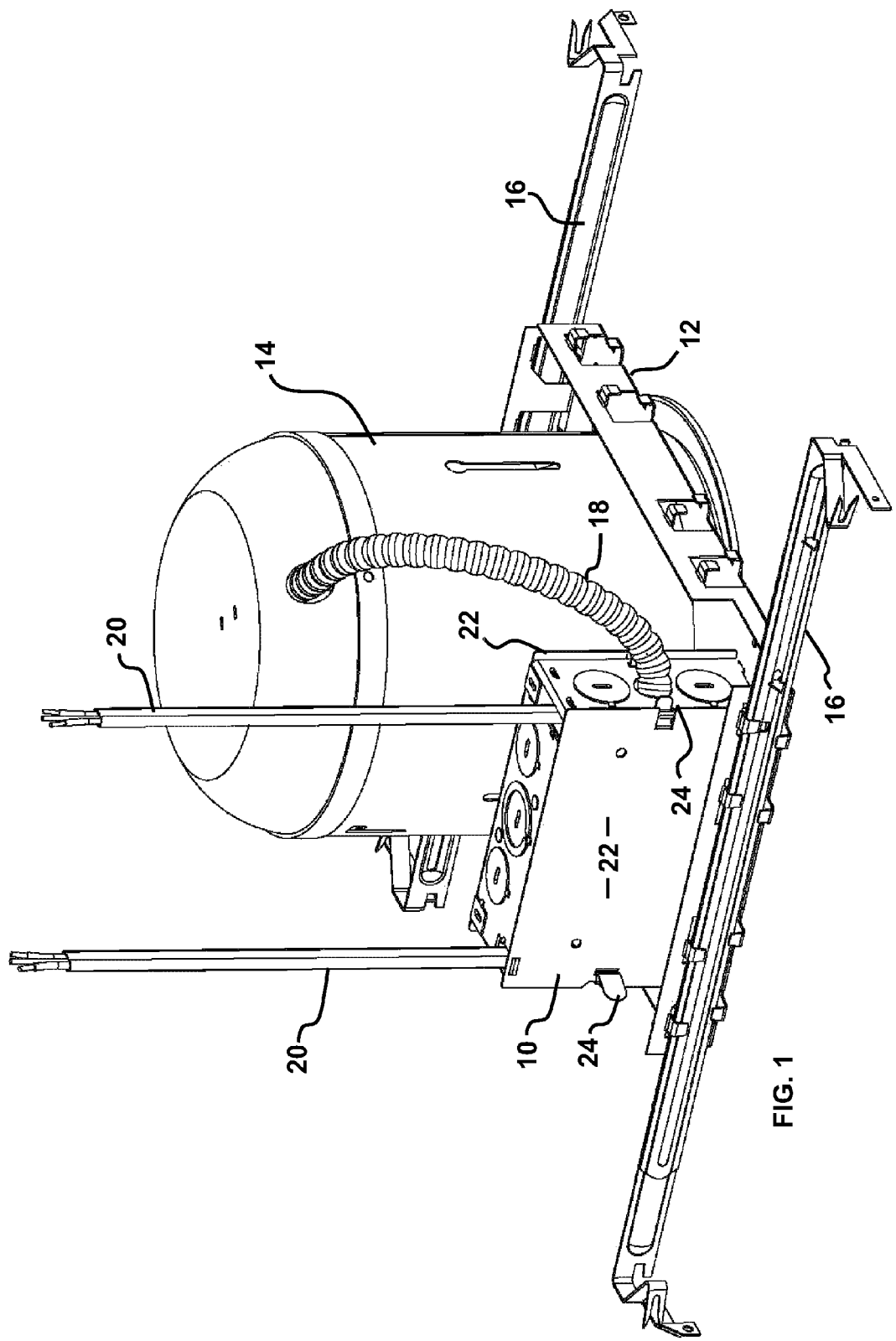

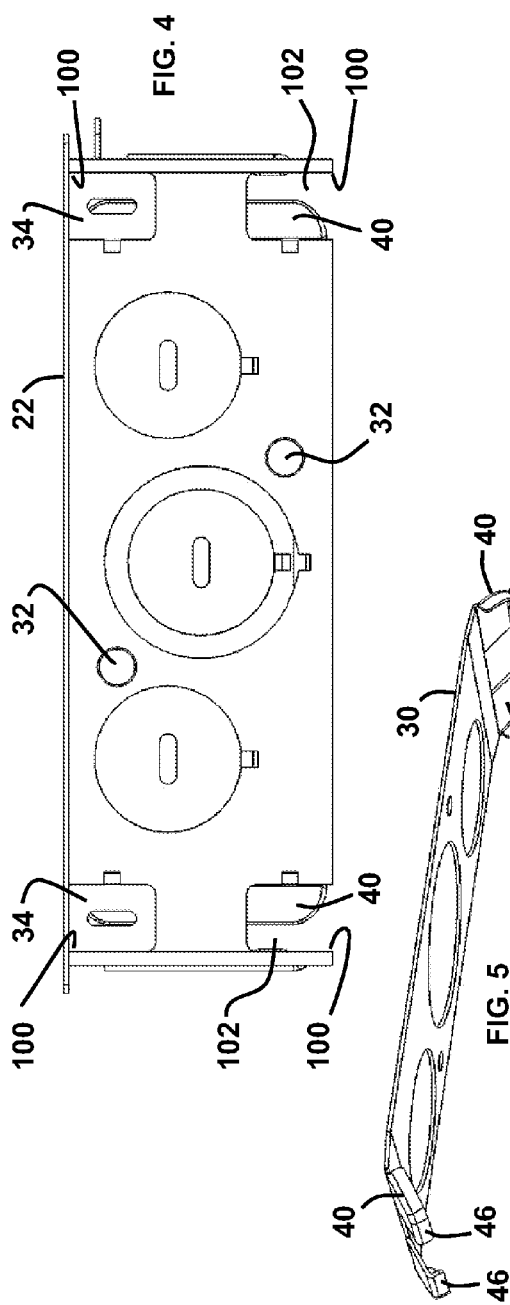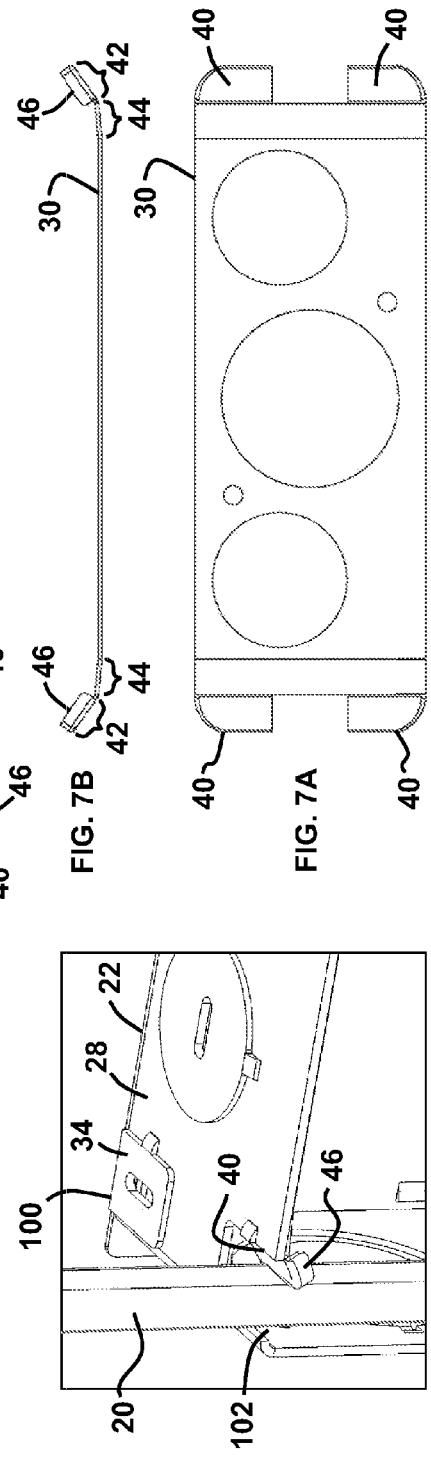

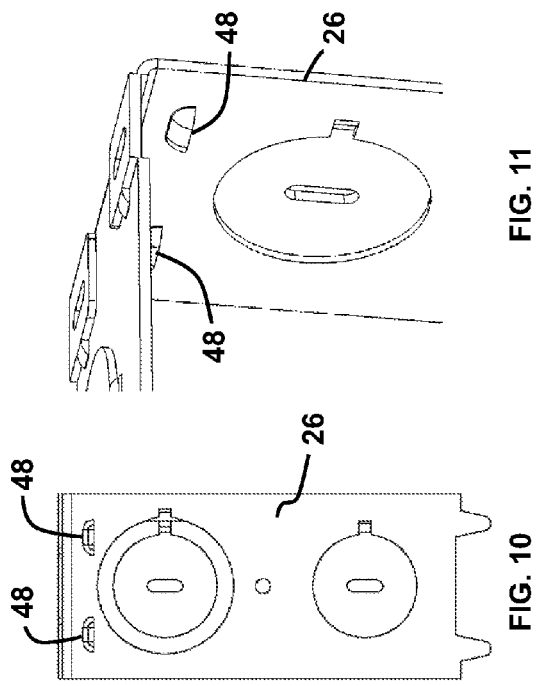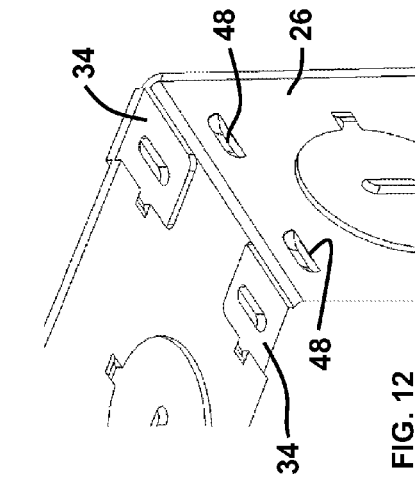

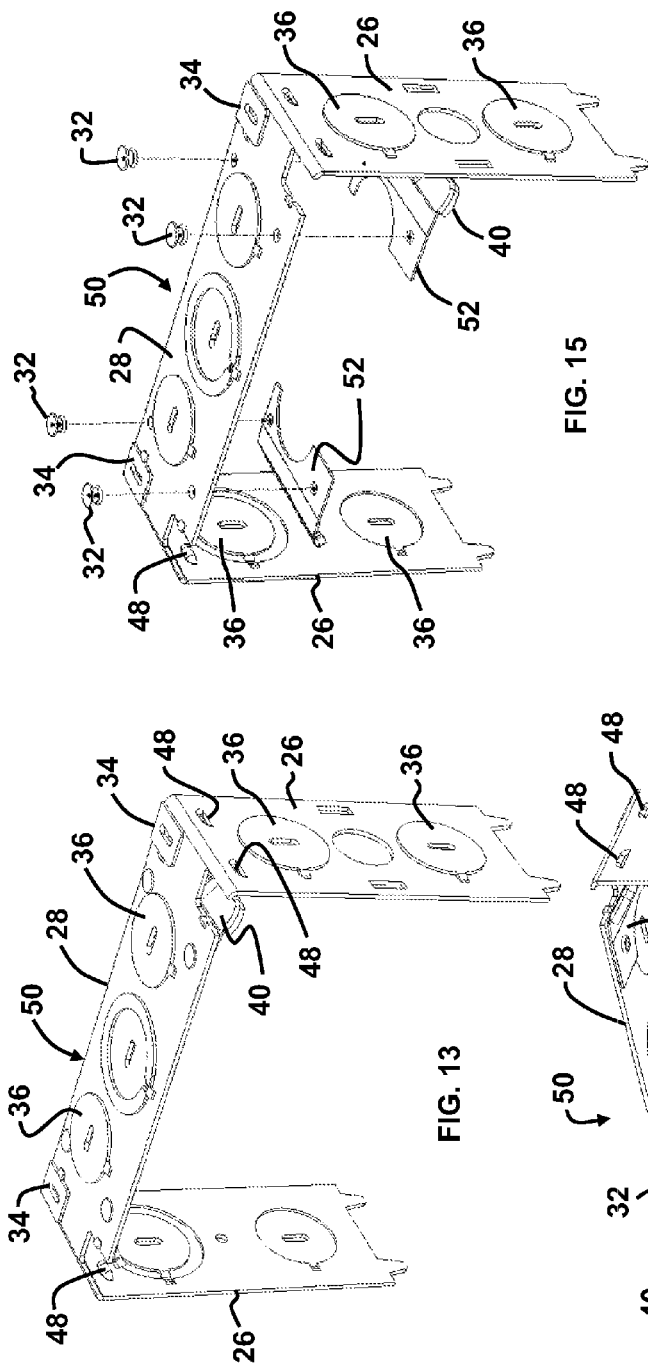
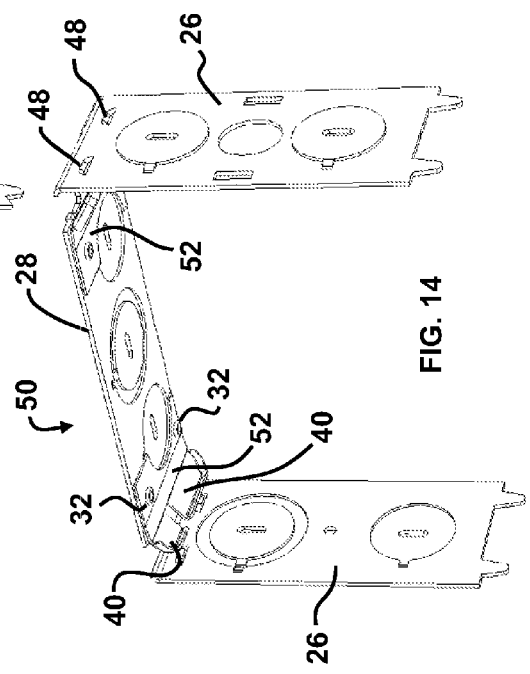

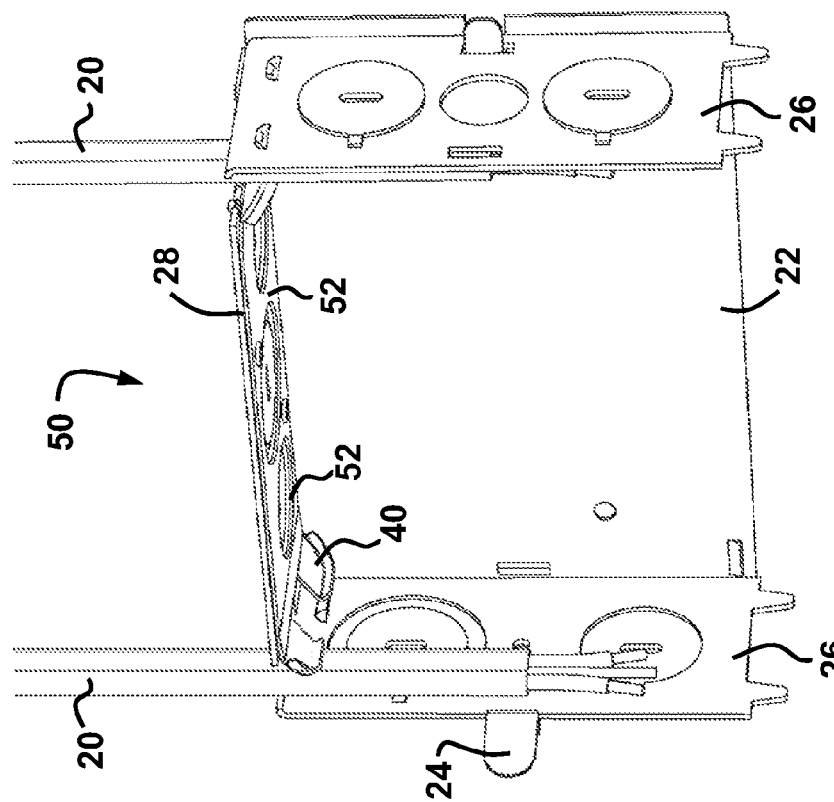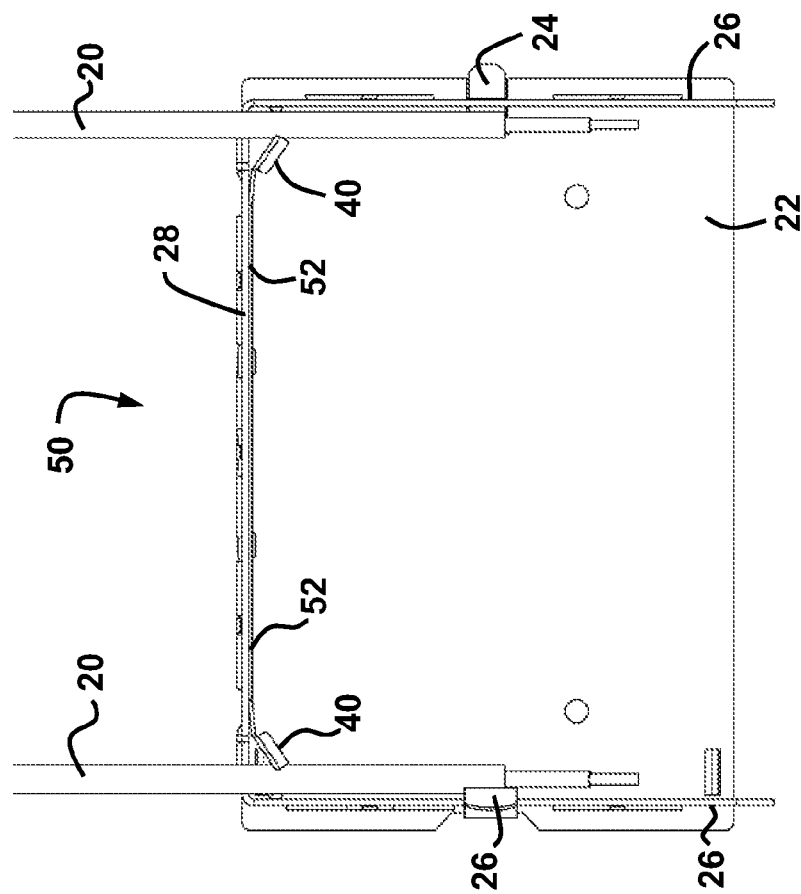

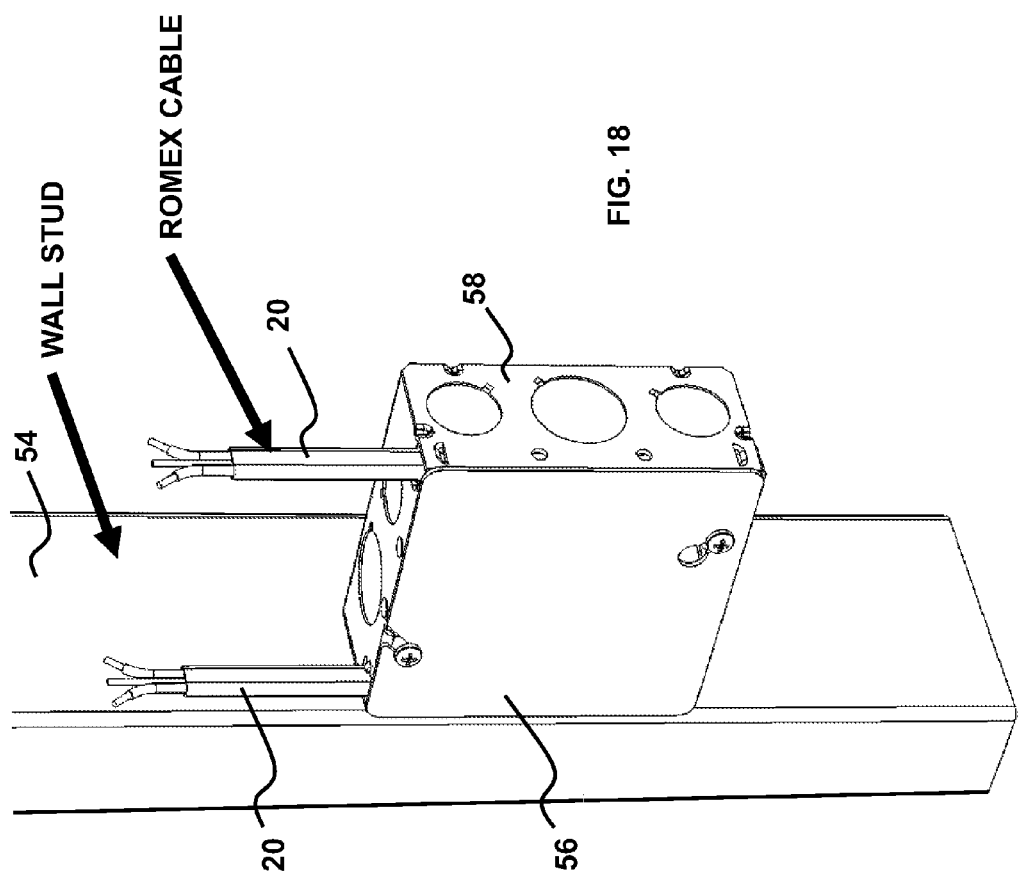

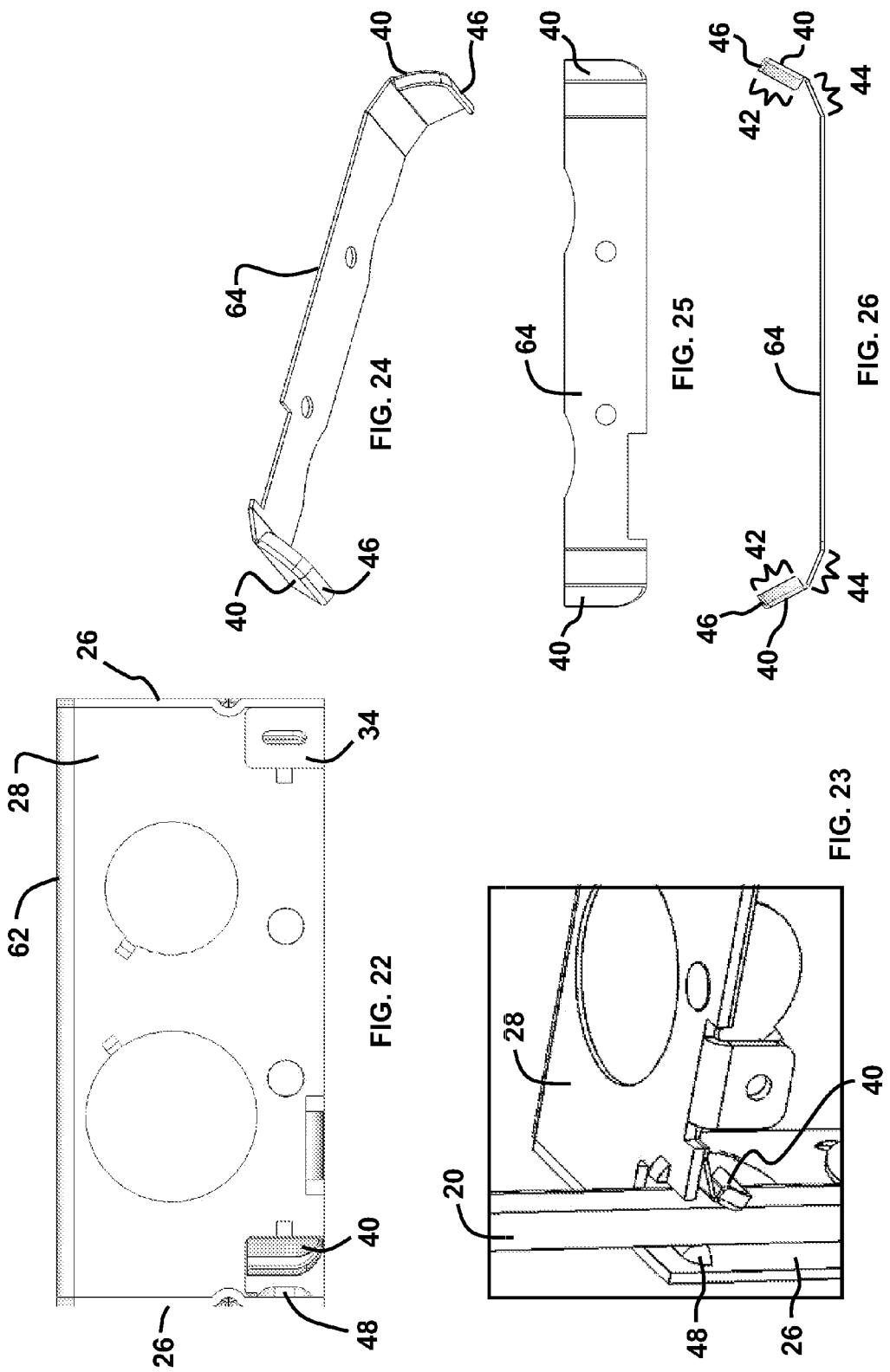

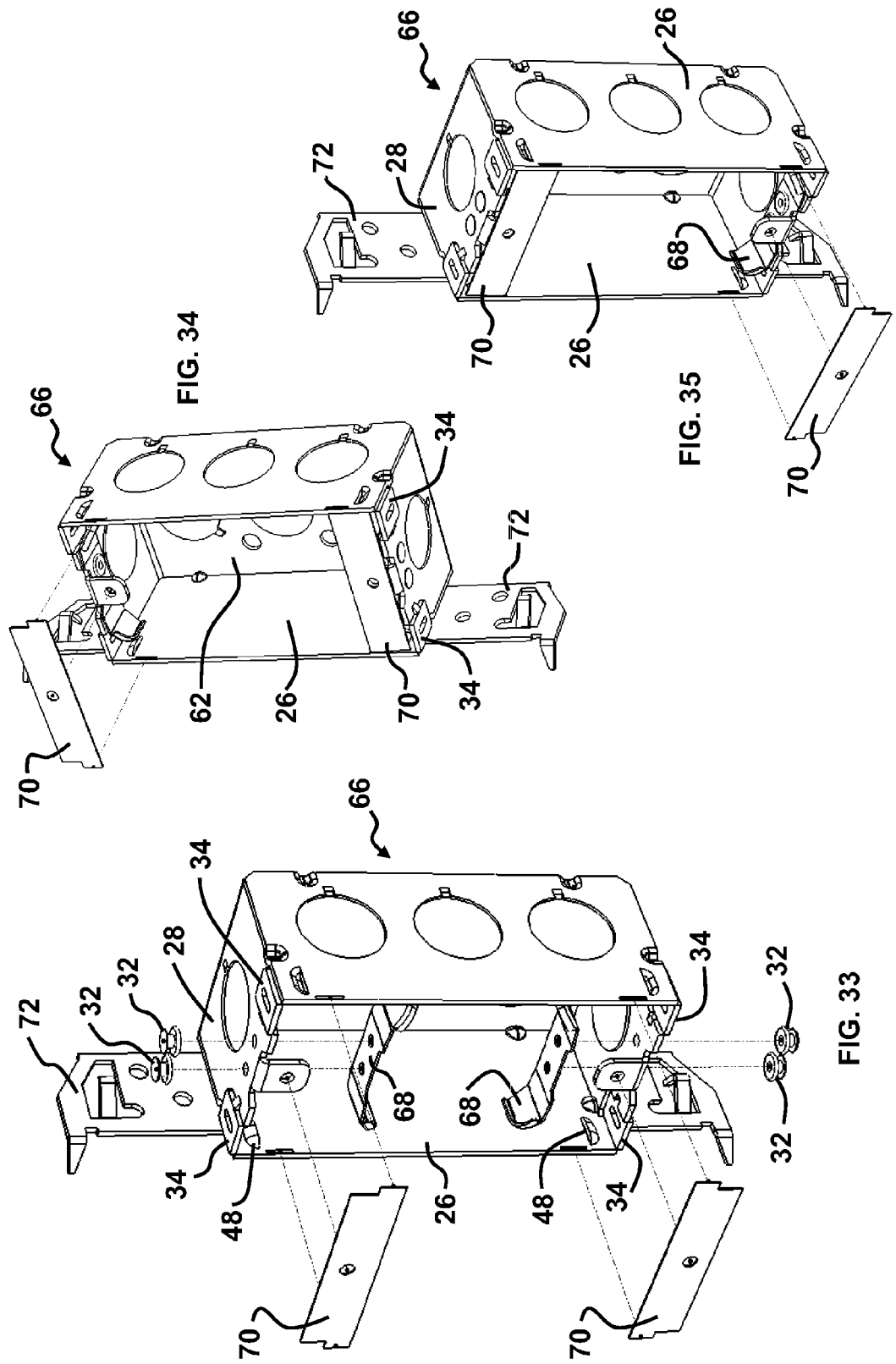

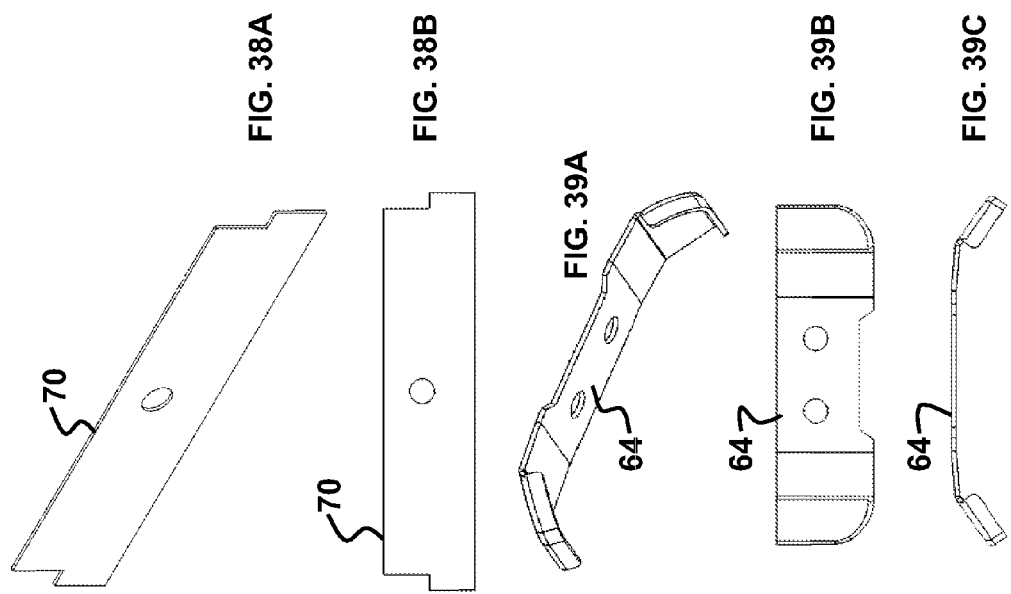
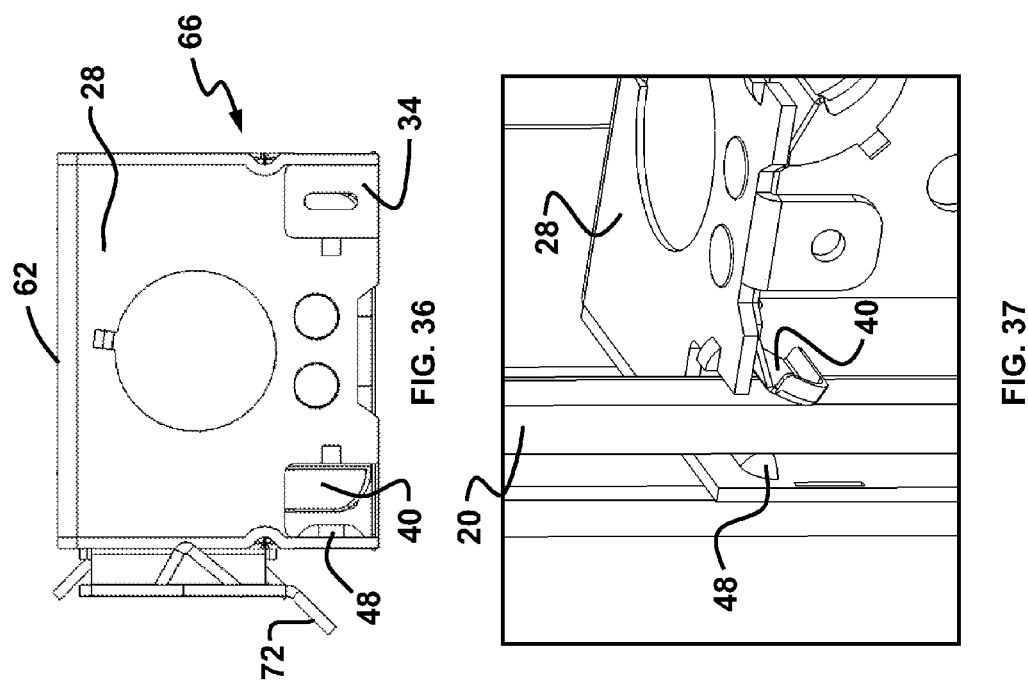

ELECTRICAL JUNCTION BOX

BACKGROUND

The present invention is directed to a electrical junction box commonly found in residential construction. More precisely, the present invention is directed to an electrical junction box that easily connects with ROMEX® and like sheathed electrical cable and in certain application, can slide along the electrical cables.

ROMEX® is the brand name for a type of plastic insulated wire commonly supplied by WesBell Electronics, Inc., Merrimack, N.H., USA. It is also know in the trade as non-metallic sheath or NM cable, and has two or three insulated wires plus a bare ground wire all wrapped together in a plastic sheathing. It is primarily used for indoor wiring in residences and commercial buildings to power appliances, ceiling fans, lights, AC sockets or outlets, switches, etc. The electrical cable is run through with or without conduits along the interior of walls or ceilings of a home, and is available in many wire sizes depending on application and building electrical codes.

Armored cables hold conductor wires inside a flexible steel or aluminum sheath and are known as BX or Armored Cable (AC). Armored cables with the metallic sheath provides more protection for the encased electrical conductors that non-metallic sheath cables.

In residential wiring, an electrical junction box or J-box is used as a terminus to ROMEX®, BX, and like electrical cables. The terminus is typically the location for a light, AC outlet, light switch, etc. Conventional junction boxes is a metal, plastic, or ceramic box where electrical cables pass into the box and the exposed electrical conductors contained in the cables are wired to terminal strips to complete and join electrical circuits. Somehow, the cable or conduit must be attached to the junction box.

Typically, the ROMEX® cable, BX cable, or flexible metal conduit is attached to an electrical junction box by use of a collar at the end of the cable or conduit. The collar affixes the plastic sheathed cable or metal conduit to a knock-out opening in a wall of the junction box housing, wherein the tubular-shape collar clamps to the wall with a threaded flange, a radiator hose style clamp, radial barbs, or pop-open wings similar to a toggle bolt that hold the collar to the surrounding wall. With the conduit or sheath affixed to the wall, the exposed conductor wires pass through the center opening of the collar and into the interior of the junction box where the electrical connections are made. Other structures such as fingers and inserts are used to grip, wedge, or otherwise affix the metal conduit or sheathed cable to the junction box.

A junction box is also located next to the can of a recessed lighting fixture. Non-metallic and metallic sheathed cables and conduits pass into the junction box and out from the junction box to the can to power the lamp inside the can.

SUMMARY OF THE INVENTION

The present invention is directed to a junction box that can be easily connected to a flexible metallic conduit, metallic or non-metallic sheathed cables, and the like. The electrical junction box for receiving a sheathed electrical cable and/or flexible metallic conduit comprises a multisided box defined by opposed walls defining an interior cavity, wherein the walls include corners; at two openings formed in one of the walls proximate to the corners and at least two openings formed in an opposed walls so that the two openings are aligned with the other two openings. The junction box further includes pry out plates covering the plurality of openings; a strain relief bracket at least partially extending across a width of the cavity and attached contiguously with at least one of the walls having the openings, wherein a distal end of the strain relief bracket is bent at an angle and slightly protrudes into the opening. When the pry out plates are detached, the sheathed electrical cable passes through the opposed and aligned openings and into and out of the cavity, the curved distal end of the strain relief bracket frictionally engages the electrical cable under bias against an indent on an opposed wall. The electrical cable is thus retained in the junction box.

In various preferred embodiments, the pry out plate is attached to the wall by a tab, and the pry out plate overlies the wall to swing open away from the cavity at the tab. The pry out plate also easily detaches from the wall by breaking the tab. The strain relief bracket is preferably in sheet form and the curved distal end of the strain relief bracket includes a lip. The lip and curved edge reduce the likelihood of an exposed sharp edge cutting into the plastic sheathing of the electrical cable during installation. A cut in the sheath could expose the live wire underneath and cause a short when the exposed wire touches a nearby metal component or another conductor.

An optional indent is formed in a wall opposite the curved distal end of the strain relief bracket such that the indent extends into the cavity toward the curved distal end and also includes a curved profile. Accordingly, the sheathed cable is essentially pinched by the indent and distal end of the strain relief bracket to retain the cable inside the cable box, yet allows relative sliding movement. Finally, the curved profile of the indent exposes the sheathed cable to a rounded or blunt surface reducing the likelihood of cutting into the plastic sheath.

In a preferred embodiment, the strain relief bracket is a strip of sheet material and the curved distal end of the strain relief bracket preferably has two-stage folds in the strip. The two-stage folds lead to a cantilevered distal end that engages the sheathed wire or conduit, wherein the folds impart a resilience to that portion of the strain relief bracket which is biased into the cable.

BRIEF DESCRIPTION OF THE DRAWINGS

FIG. 1 is a perspective view of a preferred embodiment junction box assembled to a recessed lighting fixture with ROMEX® cables passing into the junction box.

FIG. 4 is a top plan view of the junction box from FIG. 2.

FIG. 5 is a perspective view of a preferred embodiment strain relief bracket.

FIG. 6 is an enlarged view showing a ROMEX® cable held in position by a cantilever distal end of the strain relief bracket.

FIG. 7A is a top plan view of the strain relief bracket from FIG. 5.

FIG. 7B is a side elevational view of strain relief bracket from FIG. 5.

FIG. 8 is a front elevational view of three walls of a junction box.

FIG. 9 is a front elevational view wherein ROMEX® cables extend into the junction box shown in FIG. 8, and a strain relief bracket retains the ROMEX® cables in place.

FIG. 10 is a side elevational view of the junction box shown in FIG. 8.

FIG. 11 is a detailed view showing an indent extending inside the junction box.

FIG. 12 is a detailed view of the pry outs at the top of the junction box adjacent a corner with the respective indents.

FIG. 13 is a perspective view of three walls of an alternative embodiment junction box wherein two pry outs have been removed to show the strain relief bracket underneath.

FIG. 14 is an underside view of the junction box shown in FIG. 13.

FIG. 15 is a perspective view of the junction box from FIG. 13 wherein the junction box has two discrete strain relief brackets attached thereto.

FIGS. 16 and 17 show a junction box with a back cover attached to the back, and the front cover omitted to expose the interior.

FIG. 18 is a perspective view of an alternative embodiment junction box attached to a wall stud, wherein the ROMEX® cable can slide into and out of the junction box.

FIG. 22 is a top plan view of a junction box showing one pry out removed and one pry out untouched.

FIG. 23 is a detail view showing a ROMEX® cable passing through an opening where the pry out has been removed.

FIGS. 24, 25 and 26 are various views of a strain relief bracket.

FIG. 33 is an exploded view of the junction box shown in FIG. 32.

FIGS. 34 and 35 are perspective views showing the assembly of the strain relief brackets and retainer brackets to the interior of the junction box.

FIG. 36 is a top plan view of the junction box shown in FIG. 32.

FIG. 37 shows a ROMEX® cable passing through an opening where the pry out has been removed.

FIGS. 38A and 38B give different views of the cable retainer bracket.

FIGS. 39A, 39B, and 39C are various views of an alternative embodiment strain relief bracket.

DETAILED DESCRIPTION OF THE PREFERRED EMBODIMENTS

Figure 3:
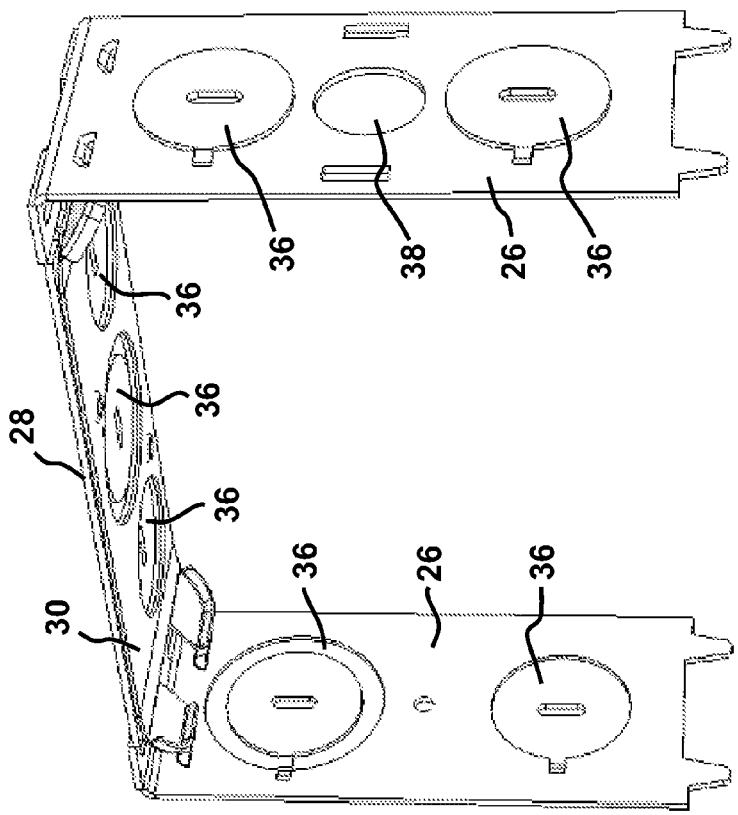
FIG. 3 is an assembled underside view of the three walls from FIG. 2.

The present invention in various embodiments is directed to an electrical junction box commonly used in residential and commercial lighting applications. The junction box in the preferred embodiment includes retention structures that hold conduits and electrical cables such as ROMEX® cables inside the box yet would allow the cables to slide in or out of the junction box as needed.

FIG. 1 is a perspective view of one preferred embodiment of the present invention junction box 10. In this embodiment, the junction box 10 is mounted to the frame 12 of a standard recessed lighting fixture having a can housing 14. The frame 12 further includes two parallel hanger bars 16 that facilitate installation of the recessed lighting fixture within the ceiling space of a commercial building or home via ceiling joists or the like. Electrical conduits and cabling extend from the junction box 10, and in this case electrical conduit 18, carries electrical wires between the can housing 14 and the junction box 10. Further, two ROMEX® type sheathed electrical cables 20 pass into the junction box 10. The junction box 10 is preferably made from stamped steel and includes front and rear covers 22 that pop off, which are otherwise held in place with spring clips 24. Of course, features of the present invention junction box can be adapted to junction boxes made from ceramic, aluminum, plastic, or a combination thereof.

Figure 2:
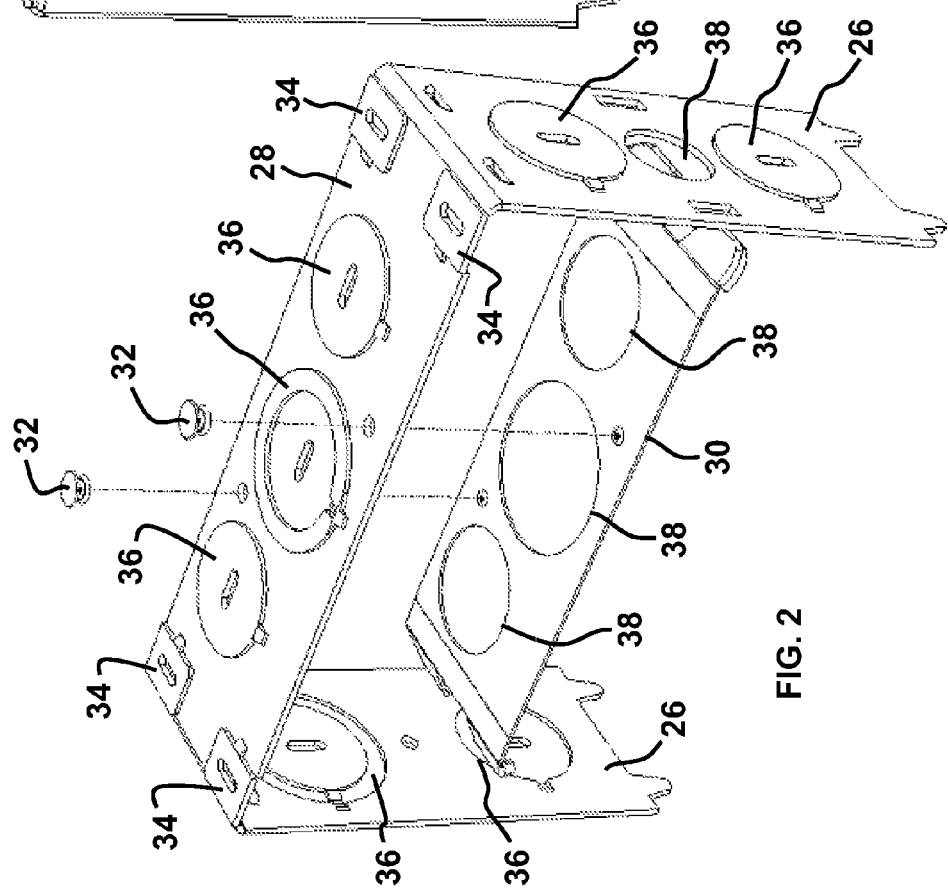
FIG. 2 is an exploded top side view of three walls of the present invention junction box, also showing assembly of the strain relief bracket to a wall.

FIGS. 2-12 are various views of a preferred embodiment junction box shown in FIG. 1. FIG. 2 is a perspective view of two side walls 26 assembled to a top wall 28 forming a portion of the junction box 10 from FIG. 1. A preferred embodiment strain relief bracket 30 is shown yet to be assembled to the top wall 28 of the junction box 10 via rivets 32 or like fasteners, or via spot weld, braze, solder, or glue.

In this embodiment, the top wall 28 preferably has pry outs 34 located at the four corners 100 of the junction box 10, as best seen in FIGS. 4-7. The pry outs 34 cover cable openings 102 underneath that are a passage to cable, conduit, or wire traps inside the box, as described in further detail below. The pry outs 34 are sections of material that can be formed from the sheet metal of the wall, or can be a discrete component welded, brazed, and attached to the sheet metal. Only a sliver of material or weld bead connects the pry out 34 to the base sheet metal for easy detachment. Each pry out 34 preferably includes a slot therethrough allowing the tip of a flat head screwdriver access therein to bend open or detach the pry out 34 to expose the underlying opening 102.

As seen in the various drawing figures, circular wire cabling pry outs 36 are liberally distributed around the walls 26, 28. Other openings 38 preferably circular in shape are located in and around the junction box 10 to enable cabling, conduits, or the like, to pass therethrough. Knock outs that cover other openings, and which can be detached from the junction box with a hammer blow, may be formed in the walls as needed.

FIG. 3 is an underside view of the three walls from FIG. 2, wherein the strain relief bracket 30 is shown assembled to the top wall 28 with rivet fasteners. In alternative embodiments (not shown), the strain relief bracket 30 can also be attached to a side wall instead of the top wall, assuming pry outs and their respective openings are formed into those side walls. In still other alternative embodiments, the pry outs and openings do not need to be located at the corners and can be positioned anywhere on any wall and the strain relief bracket is joined to that wall and accommodates the cable passing through at that location.

FIGS. 5, 7A, and 7B are different views of the preferred embodiments strain relief bracket 30. In this embodiment, the strain relief bracket 30 is made from a single sheet of material such as stamped steel. The strain relief bracket 30 has distal ends, or more precisely, cantilevered distal tabs 40 at each end and a flat central portion. From the flat central portion, moving towards the distal tab ends or curved distal ends 40, the sheet metal is bent into sections 42, 44. This is best seen in the side elevational view of FIG. 7B. There can be of course more or fewer than the two-section bends shown. The bent sections or segments 42, 44 impart further resilience in the four cantilevered, curved distal tabs 40.

Furthermore, each tab 40 preferably has a curved edge as seen in the plan view of FIG. 7A, with a curved lip 46 as best seen in FIG. 5. The curved lip 46 is created by rolling a soft edge to the sheet metal to protect the sheath of a covered cable such as a ROMEX® cable. The lip 46 can itself have an optional inward curl, an opposed curve section, or a flat section. Because the cantilevered distal tab 40 engages a sheathed cable 20 as shown in FIG. 6, the soft, rolled and curved edge minimizes any exposure of the cable sheath to possible sharp edges in the sheet metal that could cut through the sheath and short out the electrical wiring. The number of distal tabs 40 and their locations on the strain relief bracket can change to accommodate the locations of the pry outs and their respective openings. Finally, the sizes and shapes of the distal tabs 40 can be changed and modified to accommodate larger or smaller diameter cables, different cable surface textures and varying cross-sectional shapes.

In the plan view of FIG. 4, the top wall 28 is shown and two of the pry outs 34 have been removed to expose the cable openings 102 underneath. Looking through those openings 102, the cantilevered distal tabs or curved distal ends 40 of the strain relief bracket 30 can be seen extending into the opening 102. Thus, as the ROMEX® or like sheathed cable 20 passes through the openings 102, the biased distal tabs 40 is pushed away from the cable against the bias.

FIGS. 8-12 are various views of an indent 48. The indents 48 are small formations created along the interior of the side walls 26 that have a slight curve in their profile as seen in FIGS. 8 and 11. They are preferably formed from the base sheet metal by a partial punching operation out of the material making up the side wall 26. Alternatively, the indent 48 may be formed by a blob or a bump created by a weld or braze bead or the like. As best seen in the front elevational view in FIG. 9, the indents 48 are located adjacent the corners where the pry outs 34 reside. The indents 48 are designed to oppose the cantilevered distal tabs 40 of the strain relief bracket 30. The two structures acting together as seen in FIG. 9 pinch or squeeze the ROMEX® cable 20 therebetween to help retain the ROMEX® cable inside the junction box. The natural curve of the indent 48 and the two step bend 42, 44 in the cantilevered distal tab 40 as shown in FIGS. 7A and 7B apply an inward bias on the ROMEX® cable 20 to slightly resist accidental pull out. On the other hand, it is still possible to slide the ROMEX® cables 20 in and out of the junction box without damaging the sheath of the cable 20.

FIGS. 13-15 are perspective views of three walls 26, 28 of an alternative embodiment junction box 50. The walls 26, 28 have the same features as the previous embodiment including pry outs 34 at the four corners and circular pry outs 36 for alternative conduit and cable access. This junction box, however, has a two-piece strain relief bracket 52. Each piece of the strain relief bracket 52 is riveted or affixed to the top wall 28 via rivets 32. Other forms of attachment such as by welding, brazing, bonding, or via screw, snap fit, latch, hook, or the like are contemplated. As in the previous embodiment, indents 48 are formed into the side walls 26 that oppose the cantilevered distal tab 40 at the distal ends of the strain relief brackets 52. As best seen in FIG. 14, notably, the sizes of the two cantilever distal tabs 40 are different. The different sized distal tabs 40 can be used to accommodate cables of different gauges or diameters.

FIGS. 16 and 17 show the walls 26, 28 assembled to a back cover 22 and two ROMEX® cables 20 extending into the junction box 50. The front cover is omitted in the drawings to reveal the interior while the spring clips 24 can be seen, which are used to retain the cover to the junction box 50. As best seen in FIG. 17, the angled engagement of the cantilevered distal tabs 40 against the ROMEX® cable 20 helps retain the ROMEX® cable inside the junction box 50 by enabling easier sliding of the cable 20 inward yet creates drag if the cable 20 were pulled outward out of the junction box 50.

In use, all wire connections are made outside the junction box 50. The electrician slides the ROMEX® cable 20 in place inside the junction box 50, and the cable or cables are held securely in place by the strain relief brackets 52 without the need for additional fasteners or retaining mechanisms. The electrician then uses a front cover to shut and enclose the junction box 50 to finish the wiring.

FIG. 18 is a perspective view of another alternative embodiment junction box 58 attached to a standard building construction wall stud 54 with two ROMEX® cables 20 extending into the junction box 58. The junction box 58 has a front cover 56 that in this embodiment is screwed to the junction box via Phillips head screws.

Figure 20:
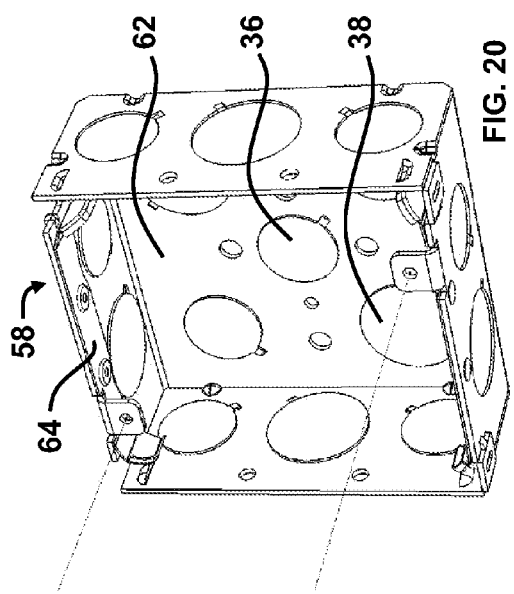
FIGS. 20 and 21 are perspective views of the junction box from FIG. 19 with the strain relief brackets assembled to the respective walls.
Figure 21:
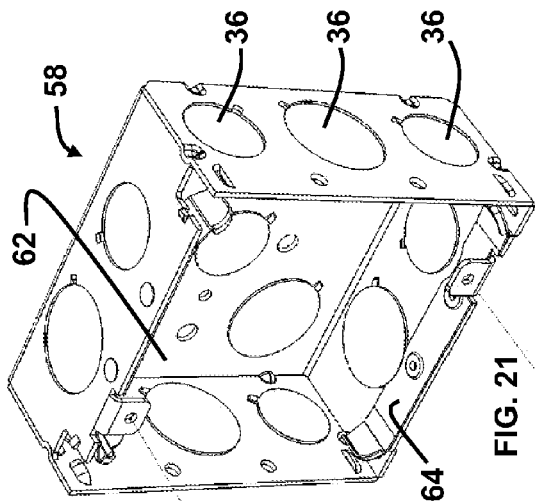
Figure 19:
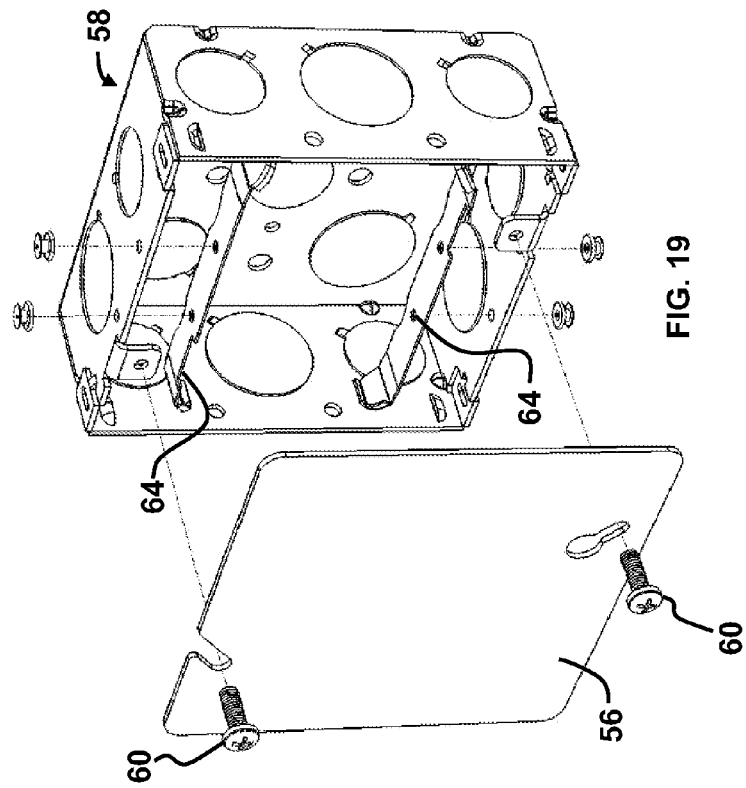
FIG. 19 is an exploded view of the junction box of FIG. 18 having two strain relief brackets contained therein.
Figure 30:
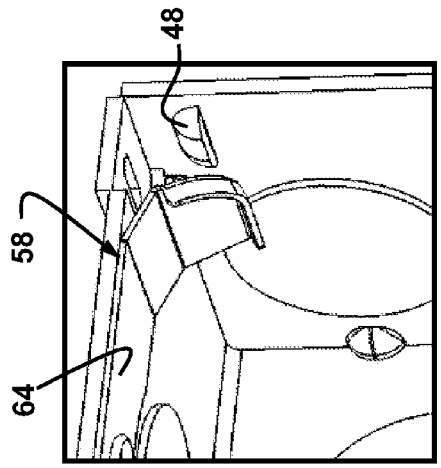
FIG. 30 is a detailed view showing the cantilevered distal end of a strain relief bracket extending toward an indent.
Figure 31:
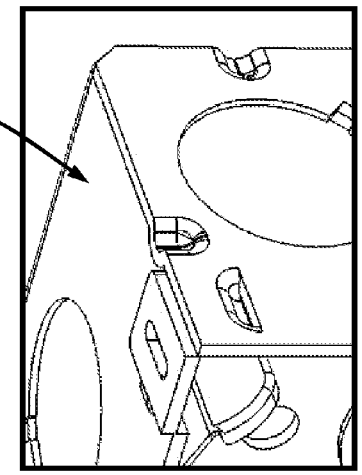
FIG. 31 is an enlarged detailed view of the junction box from FIG. 27 showing the indent and a pry out.
Figure 29:
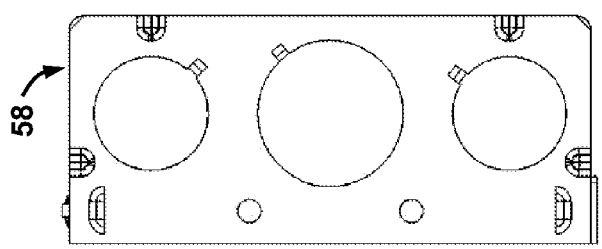
FIG. 29 is a side elevational view of the junction box of FIG. 27.
Figure 27:
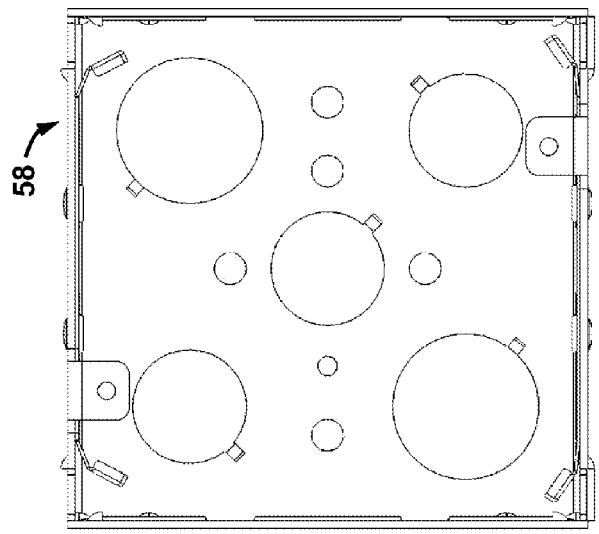
FIG. 27 is a front elevational view of the junction box from FIGS. 19-21 with the strain relief brackets installed and pry outs at the top removed.

FIGS. 19-21 are different views of the alternative embodiment junction box 58 shown in FIG. 18. In this embodiment, the front cover 56 uses two Phillips screws 60 or like fasteners to attach the cover 56 to the junction box 58. As seen in FIGS. 20 and 21, this junction box 58 has a back cover 62 that includes circular knock outs 38 and optional pry outs 36. Furthermore, this junction box 58 includes an alternative embodiment strain relief bracket 64. It is preferred, as seen in FIG. 19, that two strain relief brackets 64 are used and as seen in FIGS. 20 and 21, are attached to the top and bottom walls. In FIGS. 24-26, the strain relieve bracket 64 is illustrated in various views. The strain relief bracket 64 preferably has a single cantilevered distal tab 40 at each end. The strain relief bracket 64 has a flat strip shape with a two-section bend at each end. The two-section bends 42, 44 create a flexibility and resilience in the cantilevered distal tab 40. Portions of the strain relief bracket 64 have optional cutouts (in FIG. 25, two crescents along the bottom edge and a rectangle along the top edge) to accommodate formations and wiring inside the junction box 58. Further, the cantilevered distal tabs 40 include an optional curved lip 46.

Figure 28:
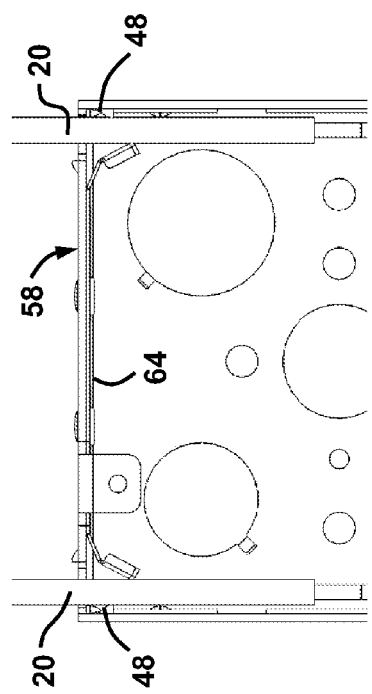
FIG. 28 is a front elevational view of the junction box showing the ROMEX® cables passing through the openings in the junction box and the interaction between the strain relief bracket and the indent with the cables.

In FIG. 22, when the strain relief brackets 64 are installed into the junction box and a pry out 34 is removed, it is apparent that a cable passing through the opening will be pinched between the indent 48 formed into the side wall and one of the biased and cantilevered distal tabs 40. This pinching action creates a drag on the cabling, and the biasing easily accommodates different gauges and shapes of cabling. FIG. 23 is an enlarged detail view of a ROMEX® cable 20 passing through the opening in the top wall 28 and being engaged on both sides by the resilient, cantilevered distal tab 40 and the indent 48. FIGS. 27-31 are various views of the junction box 58 shown in FIGS. 18-21. FIG. 28 shows two ROMEX® cables 20 entering the junction box 58 and being retained therein by the indent 48 and strained relief bracket 64.

Figure 32:
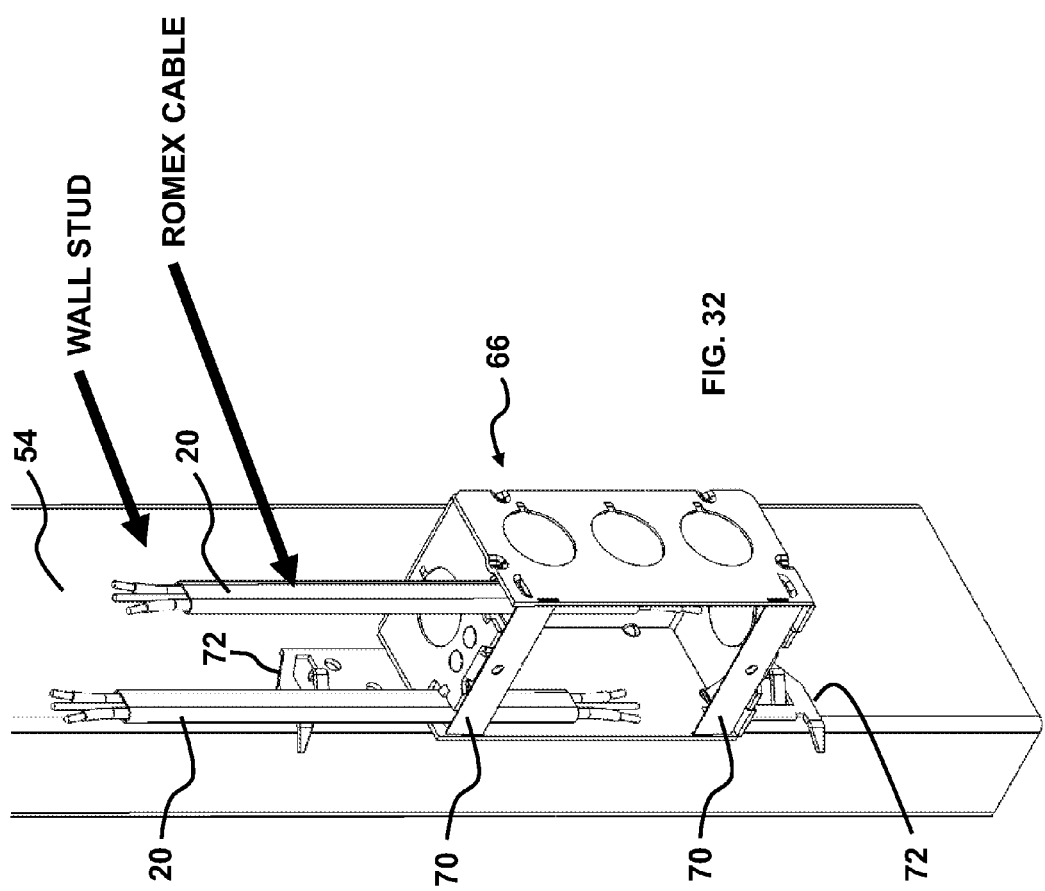
FIG. 32 is an alternative embodiment junction box shown assembled to a wall stud and having ROMEX® cables passing into the junction box.
Figure 43:
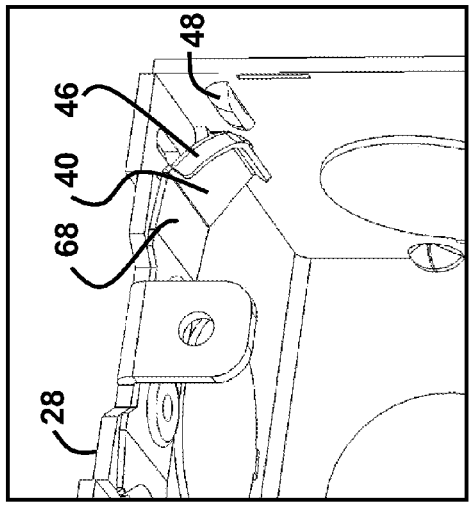
FIGS. 43 and 44 are detail views of the junction box interior and exterior.
Figure 44:
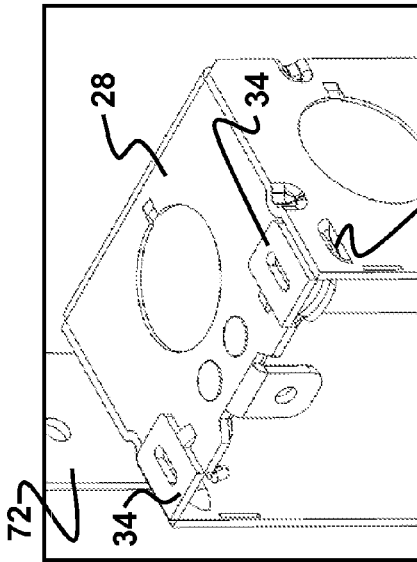
Figure 42:
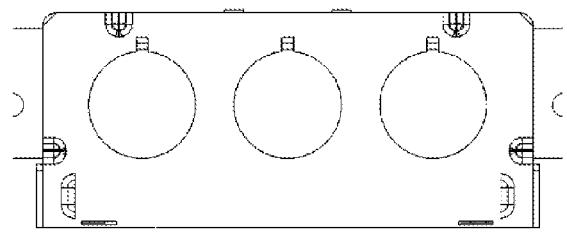
FIG. 42 is a side elevational view of the junction box shown in FIGS. 40 and 41.
Figure 40:
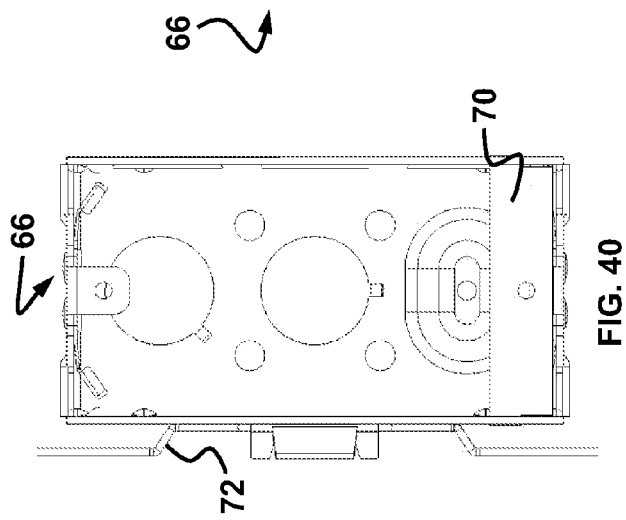
FIGS. 40 and 41 are front elevational views showing the interior of the junction box and the placement of ROMEX® cables inside the box.

FIG. 32 is a perspective view of yet another alternative embodiment junction box 66 attached to a standard wooden wall stud 54 with two ROMEX® cables 20 extending therein.

In this embodiment, there are only two pry out/openings at the top wall to receive the cables. This embodiment is a four inch by two inch junction box 66 attached to a standard wall stud 54. All wire connections are made outside the junction box 66. The ROMEX® cable 20 is then slid into place inside the junction box 66. The ROMEX® cable 20 is held securely in place by the strain relief bracket 68 and a ROMEX® retainer bracket 70. One side wall of the junction box includes attachment hardware 72 to fasten the junction box to the wooden wall stud 54 by screws or nails.

FIGS. 33-35 show the alternative embodiment junction box 66 wherein the front cover is omitted. Two ROMEX® retainer brackets 70 are attached to the top and bottom of the junction box 66 to correspond to pry outs/openings 34 in the top and bottom walls. The junction box 66 has a plurality of knock outs and pry outs 36 to accommodate conduits and sheathed cables as well as pry outs 34 located at the corners of the junction box 66. The pry outs 34 are located at the front of the junction box to complement the ROMEX® retainer brackets 70 that are also attached to the front of the junction box 66. Inside the junction box are preferably two strain relief brackets 68 that are attached to the top and bottom walls via rivets 32.

Accordingly, as shown in FIGS. 36 and 37, the ROMEX® cable 20 is held within the opening in the top wall 28 by the strain relief bracket 68 pushing against the indent 48 and being enclosed or circumscribed within the opening underneath the pry out 34 by the ROMEX retainer bracket 70. The optional front cover can then be omitted.

FIGS. 38A and 38B provide different views of a preferred embodiment ROMEX retainer bracket 70. FIGS. 39A-C provide different views of the strain relief bracket 64.

Figure 41:
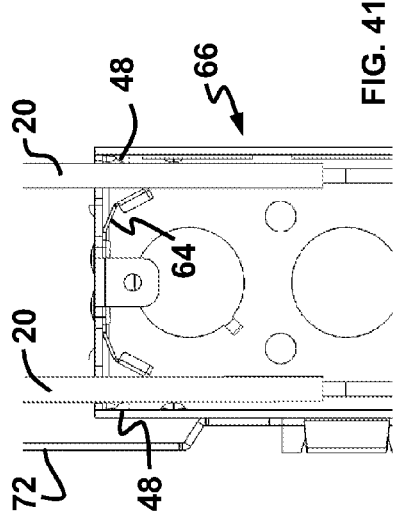

FIGS. 40-44 provide different views and enlarged detail views of the junction box 66. FIG. 41 shows how the ROMEX® cables 20 are passed into the junction box 66 and retained by the strain relief bracket 64 and the indents 48.

Although the junction boxes described have square corners and straight and flat walls, the present invention can be applied to junction boxes of different shapes and sizes. For example, a cylindrical junction box may have one or more pry outs/openings in its curved circumferential wall that can be complemented by a similarly curved strain relief bracket with resilient distal end tabs that intrude into the openings. Whatever cable or conduits that pass through the pry out/openings can be gripped by the biased distal tabs While particular forms of the invention have been illustrated and described, it will be apparent that various modifications can be made without departing from the spirit and scope of the invention. Accordingly, it is not intended that the invention be limited, except as by the appended claims.

We claim:

1. An electrical junction box for receiving a sheathed electrical cable, comprising:
opposed left and right side walls joined with opposed top and bottom walls joined with a back cover to define an interior cavity with one side open, wherein the walls and back cover form a plurality of corners;
at least one cable opening proximate to one of the plurality of corners and formed in one of the walls;
a pry out plate covering the cable opening;
a strain relief bracket extending across a width of the cavity and disposed immediately abutting the cable opening, wherein at least one end of the strain relief bracket is bent at an angle and includes a curved distal tab; and
wherein when the pry out plate is removed, the sheathed electrical cable passes through the cable opening and into the cavity and the curved distal tab of the strain relief bracket frictionally engages and biases the electrical cable against at least one of the left and right side walls to retain the sheathed electrical cable within the cavity.

2. The electrical junction box of claim 1, wherein the at least one of the left and right side walls includes an indent extending into the cavity to engage the sheathed electrical cable.

3. The electrical junction box of claim 1, wherein the curved distal tab of the strain relief bracket includes at least a two-stage bend.

4. The electrical junction box of claim 1, wherein the curved distal tab of the strain relief bracket includes a rounded corner.

5. The electrical junction box of claim 1, wherein the pry out plate includes a slot having a width to receive a screwdriver tip.

6. The electrical junction box of claim 1, wherein the junction box further comprises an electrical cable retainer bracket fitted to the one open side of the interior cavity of the junction box adjacent to the sheathed electrical cable.

7. The electrical junction box of claim 1, wherein the electrical cable retainer bracket fully encloses the opening through which the sheathed electrical cable passes and holding the sheathed electrical cable within the opening.

8. The electrical junction box of claim 1, wherein the electrical cable retainer bracket is resilient and is temporarily flexed for assembly to the junction box wherein the ends of the bracket fit into respective slots formed in at least one of the left and right side walls of the junction box.

9. The electrical junction box of claim 1, wherein the strain relief bracket frictionally engages the sheathed electrical cable and secures the sheathed electrical cable to the junction box.

10. An electrical junction box for receiving a sheathed electrical cable, comprising:
opposed left and right side walls joined with opposed top and bottom walls joined with a back cover to define an interior cavity, wherein the walls and back cover form a plurality of corners;
a plurality of openings located in at least one of the walls proximate to the corners;
pry out plates covering the plurality of openings;
a strain relief bracket at least partially extending across a width of the cavity and attached contiguous with at least one of the walls having the plurality of openings, wherein a curved distal tab of the strain relief bracket is bent at an angle and slightly protrudes into one of the openings of the plurality of openings; and
wherein when at least one of the pry out plates is removed, the sheathed electrical cable passes through the one opening and into the cavity, and the curved distal tab of the strain relief bracket frictionally engages the sheathed electrical cable under bias against one of the opposed left and right side walls to retain the sheathed electrical cable within the cavity.

11. The electrical junction box of claim 10, wherein the strain relief bracket is riveted to the wall.

12. The electrical junction box of claim 10, wherein the junction box includes multiple strain relief brackets that extend only partially across the cavity and are mounted to the walls to have respective cantilevered and curved distal tabs.

13. The electrical junction box of claim 10, wherein the frictional engagement between the strain relief bracket and the sheathed electrical cable secures the sheathed electrical cable to the junction box.

14. The electrical junction box of claim 10, wherein the sheathed electrical cable is a metal conduit.

15. The electrical junction box of claim 10, wherein the junction box includes an indent with a raised portion within the cavity and extending in a direction opposing the curved distal tab of the strain relief bracket to pinch the sheathed electrical cable therebetween.

16. An electrical junction box for receiving a sheathed electrical cable, comprising:
   a multisided box defined by opposed walls defining an interior cavity, wherein the walls include corners;
   a plurality of wall openings formed in at least one of the walls proximate to the corners;
   pry out plates covering the plurality of pry out openings;
   a strain relief bracket at least partially extending across a width of the cavity and attached contiguously with at least one of the walls having the plurality of wall openings, wherein a curved distal tab of the strain relief bracket is bent at an angle and slightly protrudes into one wall opening of the plurality of wall openings; and
   wherein when at least one of the pry out plates is deformed to expose the pry out opening, the sheathed electrical cable passes through the pry out opening and into the cavity, and the curved distal tab of the strain relief bracket slidably engages the sheathed electrical cable under bias against one of the opposed walls defining the interior cavity to retain the sheathed electrical cable within the cavity.

17. The electrical junction box of claim 16, wherein the pry out plate is attached to the wall by a tab, and the pry out plate overlies the wall to swing open away from the cavity at the tab.

18. The electrical junction box of claim 16, wherein the strain relief bracket is in sheet form and the curved distal tab of the strain relief bracket includes a lip.

19. The electrical junction box of claim 16, wherein an indent is formed in a wall opposite the curved distal end tab of the strain relief bracket, and the indent extends into the cavity toward the curved distal end tab and includes a curved profile.

20. The electrical junction box of claim 16, wherein strain relief bracket is a strip of sheet material and the curved distal tab of the strain relief bracket includes at least one fold in the strip.

21. An electrical junction box for receiving a sheathed electrical cable, comprising:
   a multisided box defined by opposed walls defining an interior cavity, wherein the walls include corners;
   at least two openings formed in one of the opposed walls proximate to the corners and at least two openings formed in another opposed wall so that the two wall openings are aligned with the other two wall openings;
   pry out plates covering the plurality of openings in the walls;
   a strain relief bracket at least partially extending across a width of the cavity and attached contiguously with at least one of the walls having the openings, wherein a curved distal tab of the strain relief bracket is bent at an angle and slightly protrudes into one of the openings in the walls; and
   wherein when the pry out plates are detached, the sheathed electrical cable passes through the opposed and aligned wall openings and into and out of the cavity, and the curved distal tab of the strain relief bracket frictionally engages the sheathed electrical cable under bias against an indent on one of the opposed walls, and secures the sheathed electrical cable to the junction box.

* * * * *